United States Patent [19]

Fricker

[11] Patent Number: 4,838,742
[45] Date of Patent: Jun. 13, 1989

[54] METHOD AND APPARATUS FOR MAKING AN UNDERCUT DRILLED HOLE IN A FIXED BASE

[76] Inventor: Siegfried Fricker, Wurmberger Strasse 30-34,, 7135 Wiernsheim, Fed. Rep. of Germany

[21] Appl. No.: 143,941

[22] Filed: Jan. 14, 1988

[30] Foreign Application Priority Data

Jan. 14, 1987 [DE] Fed. Rep. of Germany ....... 3700831

[51] Int. Cl.$^4$ ............................................... B23C 3/34
[52] U.S. Cl. .................................. 409/131; 408/72 B; 408/83; 408/241 B; 409/179; 409/199
[58] Field of Search ............... 409/131, 132, 175, 179, 409/178, 190, 199, 204; 408/72 R, 72 B, 79, 80, 81, 83, 67, 150, 151, 241 B, 241 G

[56] References Cited

U.S. PATENT DOCUMENTS

| | | | |
|---|---|---|---|
| 2,461,947 | 2/1949 | Weber | 408/72 |
| 2,671,381 | 3/1954 | Carlson | 408/81 |
| 2,949,064 | 8/1960 | Adcock | 409/178 |
| 3,482,475 | 12/1969 | Kuceris | 408/150 |
| 4,652,184 | 3/1987 | Fischer | 408/67 |

FOREIGN PATENT DOCUMENTS 3143462 5/1983 Fed. Rep. of Germany ...... 408/199

Primary Examiner—Gil Weidenfeld
Assistant Examiner—Daniel W. Howell
Attorney, Agent, or Firm—Foley & Lardner, Schwartz, Jeffery, Schwaab, Mack, Blumenthal & Evans

[57] ABSTRACT

The invention relates to a method of and apparatus for making an undercut in a drilled hole in a fixed base, such as concrete, masonry or the like. The shank of a milling cutter is supported and held eccentrically in the drill hole by means of a supporting sleeve which can be extended into the drill hole when the milling cutter is running. The supporting sleeve has an outside diameter slightly less than the diameter of the cylindrical drill hole so as to fit therein, and is formed with a receptacle groove extending longitudinally of the sleeve and opening at the periphery of the sleeve. The shank of the milling cutter is positioned in the groove, the axis of which is parallel to but radially outwardly spaced from the coaxial axes of the drill hole and sleeve. Rotation of the sleeve can be by a hand wheel interconnected to the sleeve, with the milling cutter rotating with the sleeve to form the undercut.

9 Claims, 6 Drawing Sheets

METHOD AND APPARATUS FOR MAKING AN UNDERCUT DRILLED HOLE IN A FIXED BASE

BACKGROUND OF THE INVENTION

The invention relates to a method and apparatus for making an undercut drilled hole in a fixed base structure, for example, concrete, masonry or the like.

To reduce stresses in a drill hole provided with an expanding plug, it is known to widen the drill hole at its bottom. However, widening a drill hole at its bottom, known in the art as undercutting, requires special tools which are expensive and complicated to handle.

SUMMARY OF THE INVENTION

The object of the invention is to provide a method of and an apparatus for making an undercut drilled hole in the base, with the undercut being simple to perform and freely selectable as to depth, shape and length.

In the method according to the invention, the milling head, when the retaining device carrying the head is being pushed into the drill hole, works its way into the wall of the cylindrical drilled hole without causing damaging loads on the milling cutter. If the retaining device has been fully advanced into the drill hole, that is, over a predeterminable part of the drill hole depth, the milling head, in accordance with its radial displacement on account of the existing eccentricity, mills the first part of the desired undercut out of the wall of the drilled hole. When the retaining device pushed into the drill hole is rotated about the drill hole axis, the milling head, on account of the eccentric mounting, is guided on a circle about the drill hole axis and the undercut is milled out over 360°.

The retaining device is advantageously advanced up close to the milling head so that forces acting radially on the head are diverted directly into the side of the drill hole via the cutter shank and the supporting sleeve. Undercuts of high accuracy can advantageously be made at the end of a blind hole by using the invention. If a combined milling cutter/drill is used, the drill hole can be drilled, the retaining device can be pushed in and the undercut milled in one operating cycle.

The apparatus comprises a simple, uncomplicated, rugged tool for making undercut drilled holes in the manner described. By means of a hand wheel, the retaining device can be easily turned without a great expenditure of force.

Further features of the invention will be apparent from the description which follows, in particular reference to the application drawings.

BRIEF DESCRIPTION OF THE DRAWINGS

FIGS. 5g, 5h and 5i are bottom plan views of the supporting sleeves shown in FIGS. 5c, 5d and 5e, respectively, with FIG. 5g being taken on line Vc—Vc of FIG. 5c;

DETAILED DESCRIPTION OF THE PREFERRED EMBODIMENTS

Figures 1, 2:
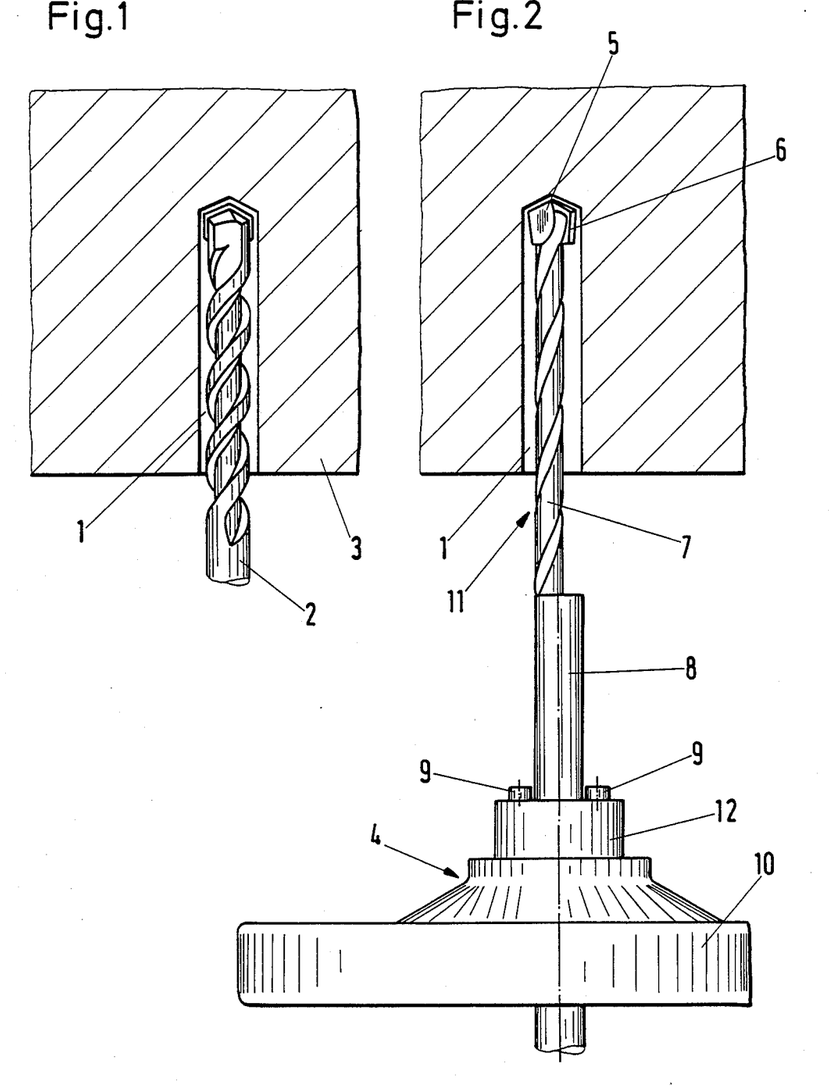
FIG. 1 is a sectional view through a drill hole produced with a drill, shown in elevation.
FIG. 2 is a sectional view similar to FIG. 1, but showing an inserted milling cutter and a retaining device pushed onto the shank of the cutter.

To produce an undercut drilled hole in a concrete wall 3, a blind hole 1 is first made in the wall 3 of a base structure in a well-known manner with a cylindrical drill 2, reference being made to FIG. 1. The drill 2 is then removed and a milling cutter 11 pushed into the drill hole 1 (FIG. 2). The head 5 of the milling cutter approximately corresponds to the diameter of the drill hole 1 and in the form shown has a lateral cutting edge 6. The shank 7 of the milling cutter 11 is made smaller in diameter than the milling head 5, with the diameter of the cutter shank 7 being preferably only half the diameter of the drill hole 1. The milling cutter 11, via its shank 7, is connected in a known manner to the drive of a drilling machine B, shown schematically in FIG. 5.

The cutter shank 7 is positioned in the supporting sleeve 8 of a retaining device 4 which in the exemplary embodiment has a hand wheel 10 which is connected coaxially to the supporting sleeve 8. For this purpose, a clamping screw 13 is screwed radially into the preferably metal hub 12 (see FIG. 5) of the hand wheel 10. The clamping screw 13 provides a nonrotational connection between the hand wheel and the supporting sleeve 8 and also secures the supporting sleeve 8 in its set axial position. When the clamping screw 13 is slackened, the supporting sleeve 8 is axially displaceable, as a result of which the length of the supporting sleeve section (see FIG. 3) extending into the drill hole 1 can be set in accordance with the drilled hole depth to be worked in each case.

Figures 5, 5A, 5B:
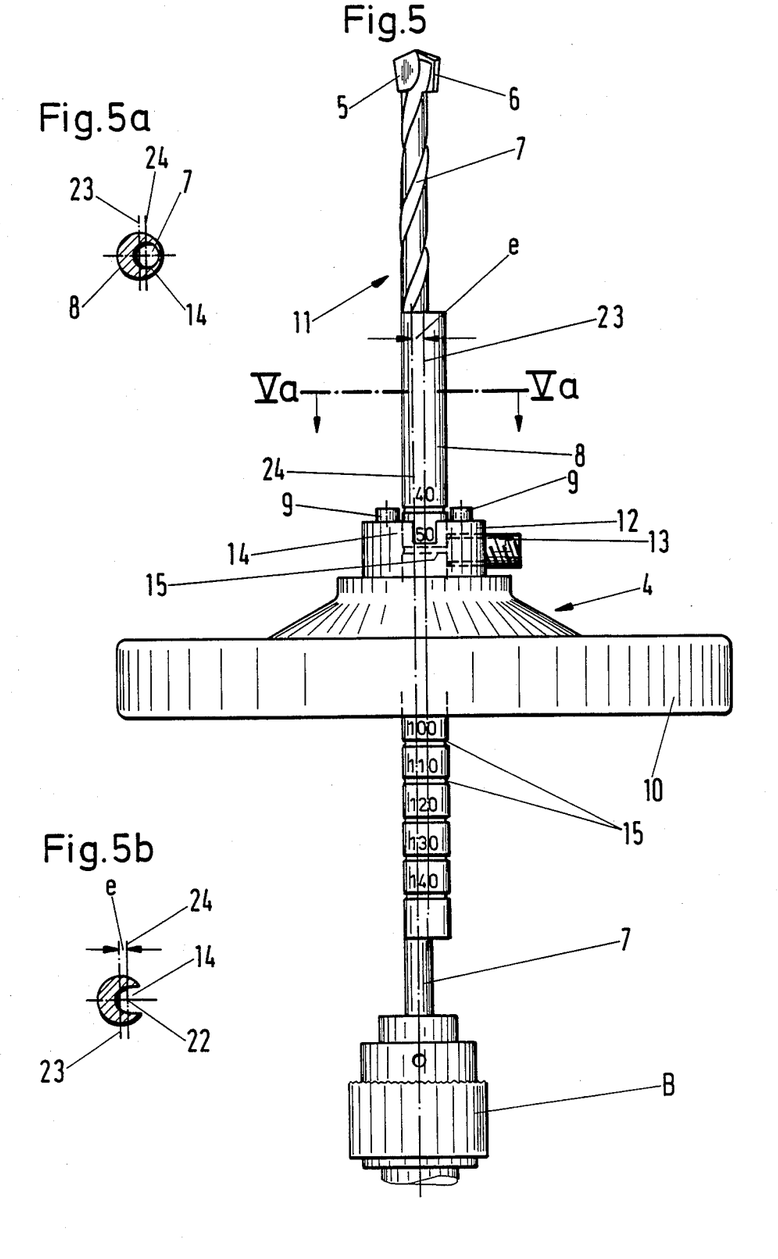
FIG. 5 is a side elevational view of the retaining device with a pushed-in milling cutter and a connected drilling machine.
FIG. 5a is a sectional view through the supporting sleeve of the retaining device, with a cutter shank being located in the supporting sleeve.
FIG. 5b is a sectional view similar to FIG. 5a, with the cutter shank being omitted.
Figures 5C, 5D, 5F:
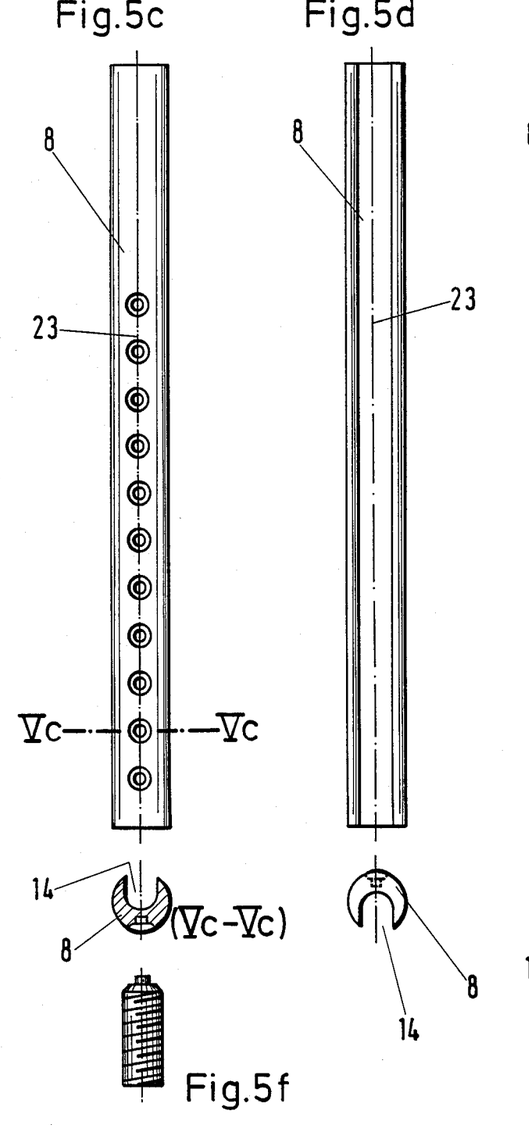
FIG. 5c is a side elevational view of the supporting sleeve.
FIG. 5d is a side elevational view of the supporting sleeve, taken in the opposite direction of FIG. 5c.
FIG. 5f is an elevational view of the clamping screw.

Referring to FIGS. 5–5i, the supporting sleeve 8 arranged coaxially to the hand wheel 10 is produced from a solid material, preferably steel, and is formed with an axially extending receptacle groove 14 for the cutter shank 7. The receptacle groove 14 is open toward the periphery of the supporting sleeve 8 and has an axis 22 (see FIG. 5b) which lies parallel to the supporting sleeve axis 23 at a distance "e" from the latter. Thus, the receptacle groove 14 is located eccentrically in the supporting sleeve 8 so that, when the hand wheel 10 is turned about the supporting sleeve axis 23 and thus about the axis of the hand wheel 10 or about the axis 1' of the drill hole 1 (see FIG. 4), the axis 22 of the receptacle groove 14 or the axis 24 of the cutter shank 7 located therein is moved on a circle of radius e about the supporting sleeve axis 23 so that the milling cutter 11 together with the head 5 moves eccentrically about the supporting sleeve axis 23 when the hand wheel 10 is turned through 360°.

The longitudinal receptacle groove 14, as a receptacle for the cutter shank 7, is not only a simple and adequate guide for the cutter shank, but it also ensures removal of the accumulating drilling dust between the side of the drill hole and the cutter shank 7 rotating in the longitudinal groove 14. The cutter shank 7 when inserted in the receptacle groove 14 also forms an outer jacket or continuing peripheral surface of the supporting sleeve 8, as shown in FIG. 5a, thus giving the supporting sleeve 8 additional-stability. In the exemplary embodiment, the eccentricity "e" is equal to the radius of the cutter shank 7, but it can be selected as desired.

Figures 3, 4:
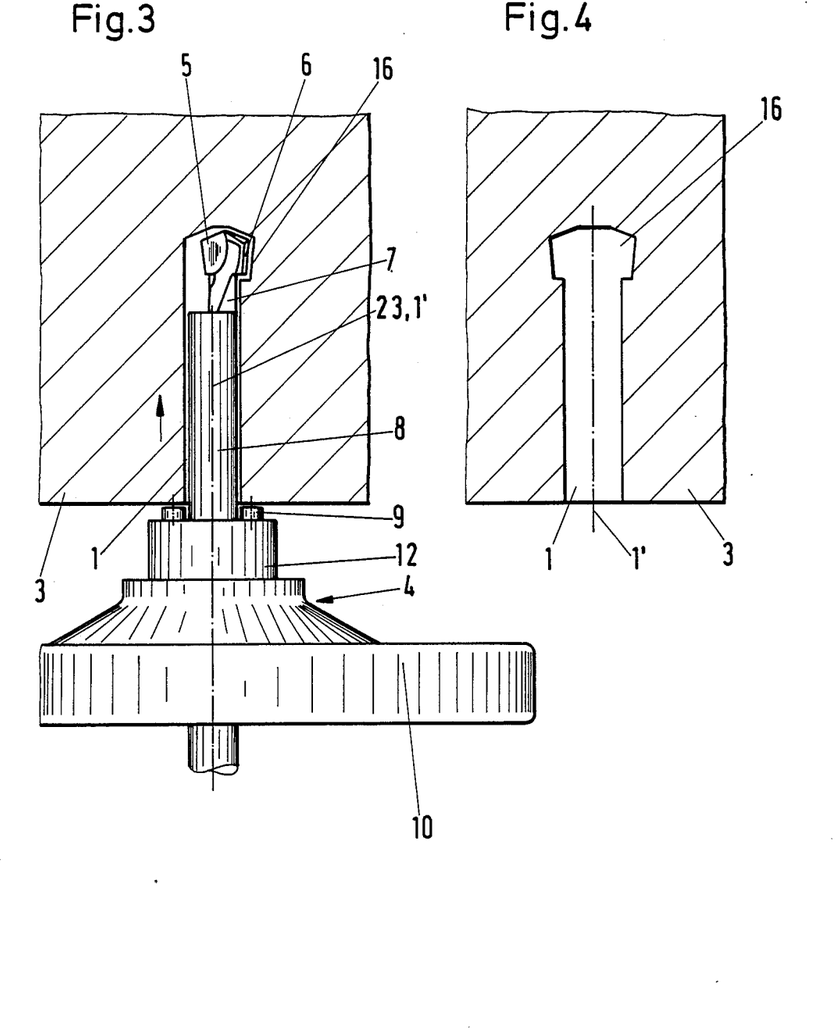
FIG. 3 is a view similar to FIG. 2, but showing the supporting sleeve of the retaining-device pushed into the drill hole.
FIG. 4 is a sectional view of the drill hole with a milled-out undercut.

In the method according to the invention, the rotating milling cutter 11 is advanced into the drill hole 1 to the bottom of the bore, and, with the milling cutter 11 rotating, the supporting sleeve 8 is pushed into the drill hole 1 (see FIG. 3). The diameter of the supporting sleeve 8 generally corresponds to the drill hole diameter. As a result of the supporting sleeve 8 being pushed into the drill hole and the existing eccentricity "e" between the axes of the receptacle groove 14 and the supporting sleeve 8, the rotating milling cutter is radially displaced in the drill hole and cuts into the cylindrical drill hole wall with its head, as shown in FIG. 3.

The supporting sleeve 8 is advanced until its free end lies closely behind the milling head 5 and supports the latter at the side of the drill hole against radial forces. The length of the supporting sleeve section required for this is set beforehand by adjustable axial displacement of the supporting sleeve in the hand wheel 10.

When work is being carried out with the device, the hub 12 of the hand wheel 10 is supported against the wall 3 by three circumferentially spaced pins 9 (see FIG. 3) which extend outwardly from the adjacent surface of its hub. The pins 9 thus space the hub from the wall to provide a free space between the hub 12 and the wall 3 for drilling dust to come out unimpeded. Instead of the pins 9, other supporting means can also be provided. Moreover, an embodiment with only one pin is possible. The quicker the guide sleeve 8 is inserted into the drill hole 1, the quicker the milling head 5 with the cutting edge 6 obtains adequately stable guidance in the drill hole so that said head can absorb corresponding milling pressures and make accurate undercuts even in hard rock or if the milling head 5 meets harder resistances, for example, iron parts or the like. At the same time, the forward feed speed of the milling head 5 can be easily adapted to the particular resistance during drilling by correspondingly turning the hand wheel slowly.

The supporting sleeve 8 designed with a longitudinal groove open toward its periphery has the advantage that drilling dust can escape by the shortest route over the entire length of the supporting sleeve so that the risk of the cutter shank 7 seizing in the supporting sleeve 8 is avoided.

After the supporting sleeve 8 has been advanced into the drill hole 1 until the pins 9 abut, the hand wheel 10 is turned, the milling head moving on a circle of radius e about the coaxial bore axis 1' and supporting sleeve axis 23, thereby milling out the undercut 16. Once the hand wheel 10 has been turned through 360°, the undercut 16 is finished as shown in FIG. 4.

Figure 5E:
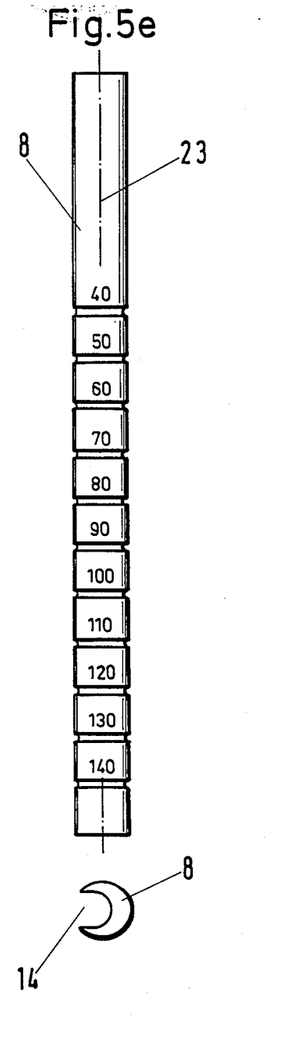
FIG. 5e is a side elevational view of a supporting sleeve having an indexing slot pattern.

Indexing slots 15 are formed in the periphery of the supporting sleeve 8 and are advantageously arranged in such a way that they are adapted to the axial working depth of the milling head 5.

Once the desired undercut has been produced, first the supporting sleeve 8 and then the milling cutter 11 are removed from the drill hole 1. Rather than turning the supporting sleeve 8 by hand wheel 10, other means could also be provided, for example, a lever connected non-rotationally to the supporting sleeve 8.

Figure 6:
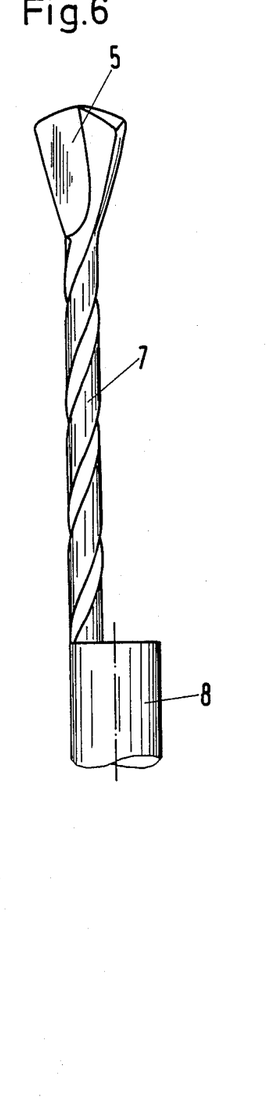
FIG. 6 a side elevation view of a drill with an integrated milling cutter for tapered undercuts.

The combined drill/milling cutter according to FIG. 6 is suitable both for drilling the cylindrical drill hole 1 and for producing a sharp-tapered undercut. A changing operation between the drill and the milling cutter is therefore not necessary so that the operating cycle for making an undercut drilled hole is advantageously shortened.

Figure 7:
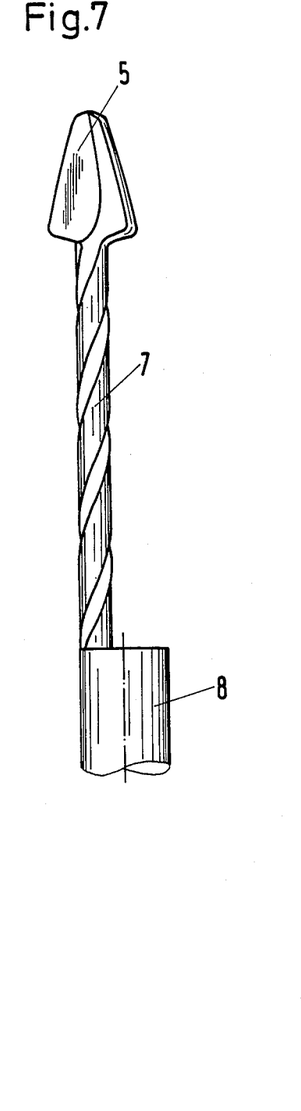
FIG. 7 is a side elevational view of a milling cutter for tapered undercuts.
Figure 8:
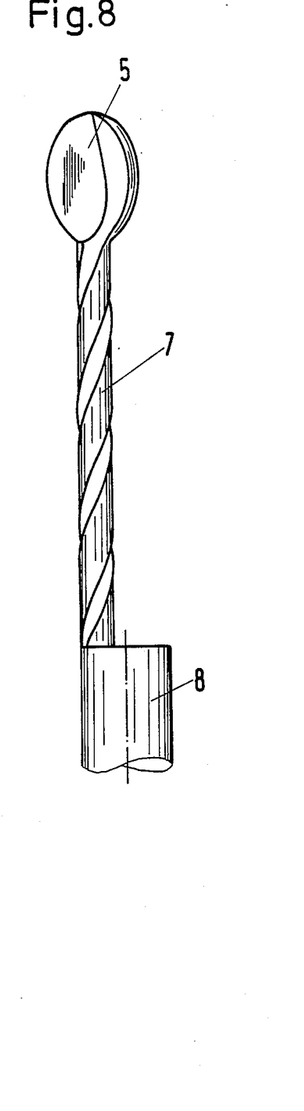
FIG. 8 is a side elevational view of a modified milling cutter for barrel-like undercuts.

Rectangular undercuts can be produced with a milling cutter according to FIG. 7, and spoon-like or barrel-like undercuts can be produced with the milling cutter according to FIG. 8. The milling cutter can also be of cylindrical design or have any other desired shape. With the method according to the invention, varying shape undercuts can therefore be made in a simple manner.

Figure 9:
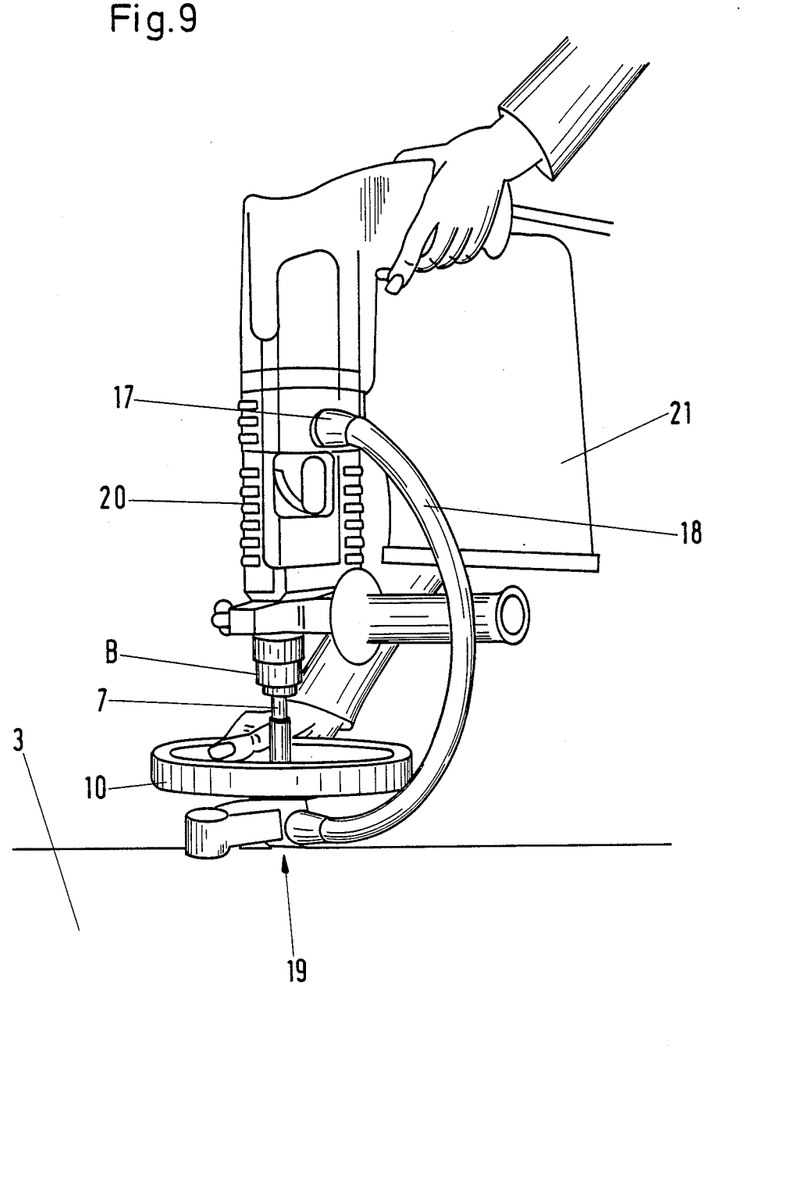
FIG. 9 is a side elevational view of the apparatus according to the invention in use with a drilling machine with a suction system.

In a further development of the invention shown in FIG. 9, provision is made for drawing off the drilling dust produced in particular during the milling of the undercut 16. For this purpose, the drilling machine 20 has a suction connection 17 which is connected via a suction tube 18 to a collecting housing 19 arranged between the hand wheel 10 and the wall 3. The drilling dust is drawn out of the collecting housing 19 via the suction tube 18 into a collecting bag 21 as shown. The shank 7 of the milling cutter extends from the supporting sleeve secured in position in the hand wheel 10 and is clamped into the drill chuck B of a drilling machine 20.

What is claimed is:

1. A process for the production of an undercut bore in a fixed base consisting of a hard substance, such as concrete, masonry or the like, and in which a cylindrical bore is predrilled in the base, comprising the steps of:
   (a) mounting a cutting head eccentrically in a separate cylindrical supporting sleeve, said cutting head having a plurality of cutting surfaces;
   (b) inserting said cutting head into the predrilled bore hole to a desired depth, and rotating said head about a first axis;
   (c) inserting said supporting sleeve a substantial distance into the bore during rotation of said cutting head to a position closely adjacent the bottom of said cutting head so as to support said cutting head against radial forces on the bore hole wall during the undercutting operation, the sleeve being adapted to rotate about a second axis spaced from said first axis and defining therewith a circular radius equal to the radial undercut in the bore;
   (d) nonrotatably fixing said sleeve to a control handle by which the sleeve can be rotated while said cutting head is rotated;
   (e) moving said handle through an arc of at least 360° whereby the cutting head removes the substance to form an annular undercut equal in depth to said circular radius;

(f) withdrawing said sleeve from said bore following undercutting; and (g) subsequently removing said cutting head from said bore.

2. Apparatus for forming an undercut in a cylindrical drill hole in a fixed base consisting of a hard substance such as concrete, masonry or the like, comprising:

(a) a supporting sleeve having a diameter such that it can be axially adjustably positioned in said drill hole, said sleeve having a longitudinal axis about which it is adapted to rotate;

(b) a continuous, longitudinally extending receiving groove formed in said sleeve, the axis of said the axis of said groove being parallel to, and spaced radially outwardly from the axis of said sleeve;

(c) a separate milling cutter positioned in said receiving groove with its axis concentric with the axis of said groove and accordingly spaced eccentrically from the axis of said sleeve, said milling cutter having a cutting head with a plurality of cutting surfaces and extending beyond said sleeve to a position adjacent the end of said drill hole, and means for separately rotating said cutter;

(d) a separate control handle, and means for nonrotatably securing said sleeve to said handle whereby the outer end of said sleeve can be positioned below and closely adjacent the bottom of said cutting head so as to support said head against radial forces on the bore hole wall during the undercutting operation;

whereby rotation of said cutter simultaneously with the rotation of said handle produces an annular undercut in said drill hole.

3. The apparatus as claimed in claim 2, wherein said control handle is a handwheel, and wherein said supporting sleeve and said handwheel are arranged coaxially to each other.

4. The apparatus as claimed in claim 2, wherein the supporting sleeve consists of steel.

5. The apparatus as claimed in claim 2, wherein the longitudinal receiving groove is open outward towards the circumference of the supporting sleeve.

6. The apparatus as claimed in 3, wherein said handwheel is provided with means at the drill hole end thereof for spacing said handwheel from said fixed base so as to form a clear space for the removal of boring dust.

7. The apparatus of claim 6, wherein said spacing means comprise pins.

8. The apparatus as claimed in 2, wherein said supporting sleeve is formed with axially spaced indexing slots in its circumference to gauge the axial working depth of the sleeve and cutter.

9. The apparatus as claimed in claim 2, further including a collecting housing with an extraction connection mounted between the handwheel and the bore hole for drawing off drilling dust.

* * * * *

UNITED STATES PATENT AND TRADEMARK OFFICE
CERTIFICATE OF CORRECTION

PATENT NO. : 4,838,742
DATED : June 13, 1989
INVENTOR(S) : Siegfried FRICKER

It is certified that error appears in the above—identified patent and that said Letters Patent is hereby corrected as shown below:

Claim 2, line 14, delete "the axis of said".

Claim 5, line 13, delete "outward".

Signed and Sealed this

Eighth Day of January, 1991

Attest:

HARRY F. MANBECK, JR.

*Attesting Officer*   *Commissioner of Patents and Trademarks*